(12) United States Patent
Yanagisawa et al.

(10) Patent No.: US 6,580,676 B1
(45) Date of Patent: Jun. 17, 2003

(54) RECORDING INFORMATION REPRODUCING APPARATUS WITH CROSSTALK CANCELER

(75) Inventors: Takuma Yanagisawa, Tsurugashiama (JP); Shogo Miyanabe, Tsurugashima (JP); Hiroki Kuribayashi, Tsurugashima (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/356,676

(22) Filed: Jul. 19, 1999

(30) Foreign Application Priority Data

Jul. 27, 1998 (JP) .......................................... 10-210897

(51) Int. Cl.[7] ................................................ G11B 7/00
(52) U.S. Cl. ............................. 369/124.02; 369/124.11
(58) Field of Search ........................ 369/124.02, 124.03, 369/44.34, 44.37, 44.35, 44.36, 124.05, 124.11, 124.12, 59.15, 44.17

(56) References Cited

U.S. PATENT DOCUMENTS 5,495,460 A * 2/1996 Haraguchi et al. ...... 369/124.03
5,729,514 A * 3/1998 Horigome et al. ...... 369/124.02
5,835,467 A   11/1998 Tomita et al. ........... 369/44.34
6,134,211 A * 10/2000 Miyanabe et al. ...... 369/124.03
6,163,518 A * 12/2000 Miyanabe et al. ...... 369/124.02

FOREIGN PATENT DOCUMENTS

JP       H9-320200       12/1997

* cited by examiner

*Primary Examiner*—Thang V. Tran
(74) *Attorney, Agent, or Firm*—Morgan, Lewis & Bockius LLP

(57) ABSTRACT

A recorded information reproducing apparatus has a crosstalk canceler to ensure fast convergence of the values of filter coefficients of an adaptive digital filter and stable operation. The recorded information reproducing apparatus comprises a reading unit for reading recorded information from one track on a recording medium to acquire a first read signal, and for reading recorded information from at least one track adjacent to the one track to acquire a second read signal; an operating unit for operating at least one coefficient on the second read signal; a subtracter for subtracting an output of the operating unit from the first read signal; and a coefficient setting unit for setting the at least one coefficient and for restricting the at least one coefficient in such a way that the at least one coefficient becomes greater than a first predetermined value or smaller than a second predetermined value.

14 Claims, 5 Drawing Sheets

RECORDING INFORMATION REPRODUCING APPARATUS WITH CROSSTALK CANCELER

BACKGROUND OF THE INVENTION

1. Field of the Invention

The present invention relates to a recorded information reproducing apparatus and, more particularly, to a recorded information reproducing apparatus that reads out recorded information from a recording medium and reproduces the information.

2. Description of the Related Art

High-density information recording on a recording medium such as an optical disc can be realized by shortening a pit length and/or narrowing a track pitch. However, narrowing the track pitch of the optical disc causes crosstalk between signals on adjacent tracks when information is read out. Such a crosstalk prevents a read signal from having a desired waveform, so that a highly reliable reproduction signal cannot be obtained from the read signal.

In this respect, a recorded information reproducing apparatus may perform an adaptive signal processing for a cancellation of the crosstalk.

For example, a recorded information reproducing apparatus disclosed in Japanese Unexamined Patent Publication (Kokai) No. H9-320200 is designed to cancel a crosstalk by using signals read from three adjoining tracks with a 3-beam optical pick-up.

More specifically, a crosstalk canceler employs adaptive signal processing, which is performed by an adaptive digital filter based on, for example, an LMS (Least Mean Square) adaptive algorithm. First, intersymbol interference is removed from a read signal that has been read from a track T with the center beam spot to obtain a series of read sample values R. Then, two series of crosstalk sample values CR1 and CR2 corresponding to crosstalk components of the tracks adjacent to the track T are acquired through the adaptive signal processing on the basis of the read signals. A series of read sample values P free from crosstalk are obtained by subtracting the series of crosstalk sample values CR1 and CR2 from the series of read sample values R.

In this case, when three consecutive values in the series of the sample values P changes from positive to negative or from negative to positive, the middle of the three sample values, i.e., a zero-cross sample value, is extracted as an error signal E. The filter coefficient of the digital filter, in turn, is updated in accordance with the intensity of the error signal E.

In other words, when a read signal is waveform-equalized so as to meet the Nyquist's second bandwidth requirement and is free of a crosstalk, the read signal crosses zero at the time it is sampled. When a crosstalk occurs, however, the waveform of the read signal is changed so that the read signal will not cross zero at the sampling time.

When a sample value at the zero-crossing time (i.e., zero-crossing sample value) is not zero, it is determined that a crosstalk corresponding to the error occurs. The conventional recorded information reproducing apparatus is constructed to update the filter coefficient of a variable coefficient filter so as to make the zero-crossing sample value corresponding to the error converges to zero.

Under certain circumstances for a crosstalk intensity, however, it may occur that the filter coefficients, which should be positive values in principle, are obtained as negative values, or that a calculation of the coefficients take a considerable time to converge. In the worst case, overflow in the crosstalk canceler may occur, thereby causing the canceler to operate unstable.

SUMMARY OF THE INVENTION

Accordingly, it is an object of the present invention to provide a recorded information reproducing apparatus having a crosstalk canceler capable of ensuring fast convergence of the filter coefficients of an adaptive digital filter and thereby achieving stable operation.

A recorded information reproducing apparatus according to the present invention comprises reading means for reading recorded information from one track on a recording medium to acquire a first read signal, and for reading recorded information from at least one track adjacent to the one track to acquire a second read signal; operating means for operating at least one coefficient on the second read signal; subtracting means for subtracting an output of the operating means from the first read signal; and coefficient setting means for setting at least one coefficient and for restricting at least one coefficient in such a way that the at least one coefficient becomes greater than a first predetermined value or smaller than a second predetermined value.

DETAILED DESCRIPTION OF THE PREFERRED EMBODIMENTS

Preferred embodiments of the present invention will now be described referring to the accompanying drawings.

Figure 1:
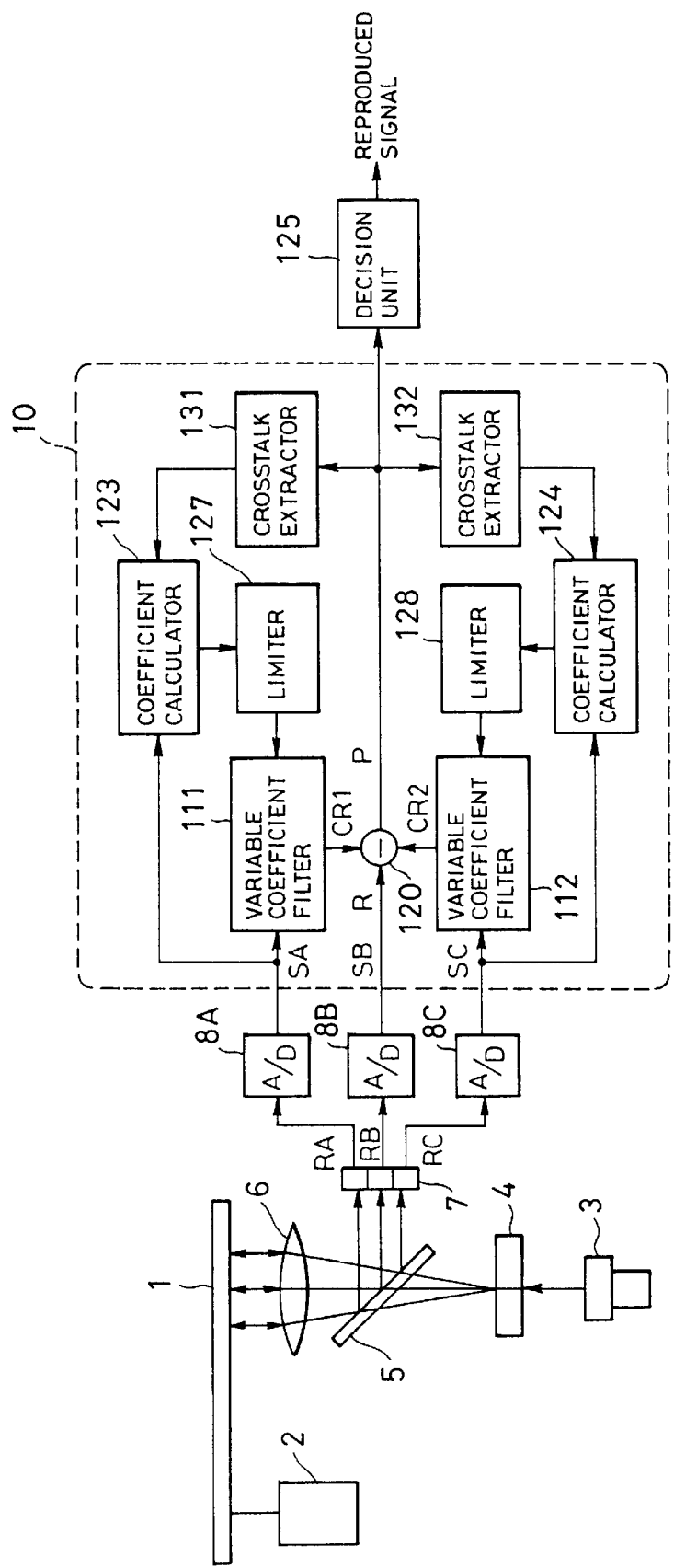
FIG. 1 is a diagram illustrating the configuration of a recorded information reproducing apparatus embodying the present invention.

FIG. 1 illustrates the configuration of a recorded information reproducing apparatus embodying the present invention.

Referring to FIG. 1, a laser beam emitted from a laser oscillator 3 is split into three beams via a grating lens 4. The three beams are respectively irradiated on three adjacent tracks of an optical disc 1 through a half mirror 5 and an objective lens 6. A spindle motor 2 rotates the optical disc 1.

Figure 2:
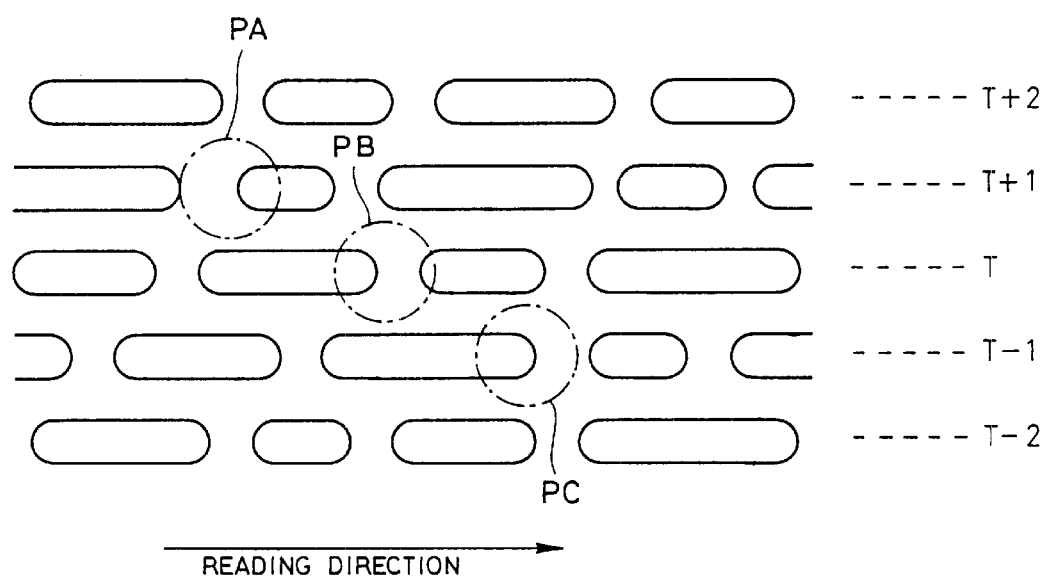
FIG. 2 is a diagram showing tracks on the recording surface of an optical disc and reading beam spots.

FIG. 2 illustrates the individual beam spots formed on the recording surface of the optical disc 1 by the three information reading beams.

When the central beam spot, PB, is formed on a track T, as shown in FIG. 2, a beam spot PA is formed on an adjacent track (T+1). Further, a beam spot PC is formed on another adjacent track (T−1) of the track T. The reflected lights from the beam spots PA, PB and PC reach a photosensor 7 via the objective lens 6 and the half mirror 5. The photosensor 7 performs photoelectric conversion on the reflected light of the beam spot PA, which has come via the half mirror 5, yielding a read signal RA. The photosensor 7 also performs photoelectric conversion on the reflected light of the beam spot PB, received via the half mirror 5, yielding a read signal RB. Likewise, the photosensor 7 performs photoelectric conversion on the reflected light of the beam spot PC, received via the half mirror 5, yielding a read signal RC. The read signals RA, RB and RC are supplied to a servo system (not shown) which implements various servos, such as tracking servo, focus servo and spindle servo, and also supplied to A/D converters 8A to 8C, respectively.

The A/D converters 8A–8C supplies a crosstalk canceler 10 with series of read sample values SA, SB and SC, which have been acquired by respectively sampling the read signals RA, RB and RC at every predetermined sampling clock.

It is to be noted that the frequency of the predetermined sampling clock is set to an integer multiple of the channel frequency of information signals recorded on the optical disc 1.

The crosstalk canceler 10 performs adaptive signal processing on the series of read sample values SA, SB and SC using, for example, the LMS adaptive algorithm, thereby acquiring series of read sample values P whose waveforms are free of both the intersymbol interference and crosstalk, and sends the series of read sample values P to a decision unit 125. The decision unit 125 determines a reproduction signal corresponding to information recorded on the optical disc 1 from the received series of read sample values P, and outputs the reproduction signal.

The internal configuration of the crosstalk canceler 10 will now be discussed.

Figure 3:
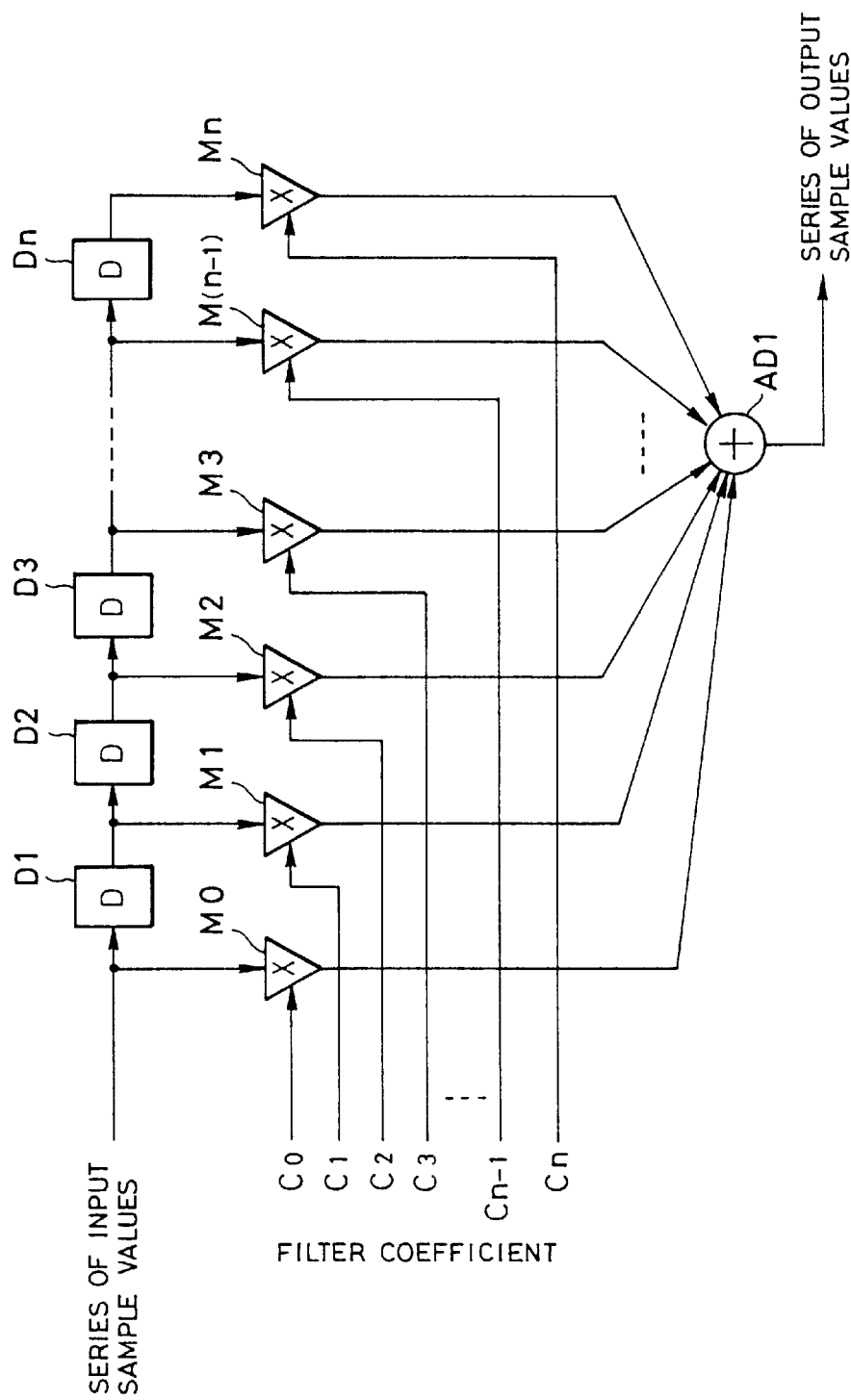
FIG. 3 is a diagram depicting the structure of a transversal filter.

The crosstalk canceler 10 comprises variable coefficient filters 111 and 112, a subtracter 120, filter coefficient calculators 123 and 124, residual crosstalk extractors 131 and 132, and limiter circuits 127 and 128. Each of the variable coefficient filters 111 and 112 is comprised of, for example, a transversal filter as shown in FIG. 3.

The transversal filter comprises N stages of series D flip-flops D1 to Dn, coefficient multipliers M0 to Mn and an adder AD1. The D flip-flops D1–Dn latch a series of input sample values while shifting them. The coefficient multiplier M0 multiplies the series of input sample values by a filter coefficient $C_0$. The coefficient multipliers M1–Mn respectively multiply the outputs of the D flip-flops D1–Dn by filter coefficients $C_1$ to $C_n$. The adder AD1 adds all the values acquired by multiplication in the coefficient multipliers M0–Mn, and outputs the resultant value as a series of output sample values.

The variable coefficient filter 111 with the above configuration filters the series of read sample values SA using filter coefficients $AC_0$ to $AC_n$ supplied from the filter coefficient calculator 123, yielding a series of crosstalk sample values CR1 corresponding to the crosstalk component from one adjacent track (the track T+1 in FIG. 2), and supplies the series of crosstalk sample values CR1 to the subtracter 120. The variable coefficient filter 112 filters the series of read sample values SC using filter coefficients $CC_0$ to $CC_n$ supplied from the filter coefficient calculator 123, yielding a series of crosstalk sample values CR2 corresponding to the crosstalk component from another adjacent track (the track T−1 in FIG. 2), and supplies the series of crosstalk sample values CR2 to the subtracter 120.

The subtracter 120 subtracts the series of crosstalk sample values CR1 and CR2 each from the series of read sample values R and sends the resultant signals as a series of read sample values P to the decision unit 125 and the residual crosstalk extractors 131 and 132, respectively.

When the value of any of three consecutive samples in the series of waveform-equalized read sample values P changes from positive to negative or from negative to positive, each of the crosstalk extractors 131 and 132 extract the value of the middle sample in the three samples or a zero-cross sample value, and sends it as an error signal E to the associated filter coefficient calculator 123 or 124.

The filter coefficient calculator 123 correlates the series of read sample values SA with the error signal E, acquiring filter coefficients, and supplies the filter coefficients to the limiter circuit 127. The limiter circuit 127 controls the filter coefficients in such a way that the filter coefficients do not become smaller than a predetermined value set or greater than a predetermined value, and sends the filter coefficients $AC_0$–$AC_n$ to the variable coefficient filter 111 as the filter coefficients $C_0$–$C_n$ of the variable coefficient filter 111.

The filter coefficient calculator 124 acquires filter coefficients on the basis of the series of read sample values SC and the error signal E, and supplies the filter coefficients to the limiter circuit 128. The limiter circuit 128 controls the filter coefficients in such a way that the filter coefficients do not become equal to or smaller than a predetermined value set or equal to or greater than the predetermined value, and send the filter coefficients $CC_0$–$CC_n$ to the variable coefficient filter 112 as the filter coefficients $C_0$–$C_n$ of the variable coefficient filter 112.

The filter coefficient calculators 123 and 124 respectively update the filter coefficients $AC_0$–$AC_n$ and $CC_0$–$CC_n$ employing the LMS adaptive algorithm in such a manner that the error signal E converges to 0.

Figure 4:
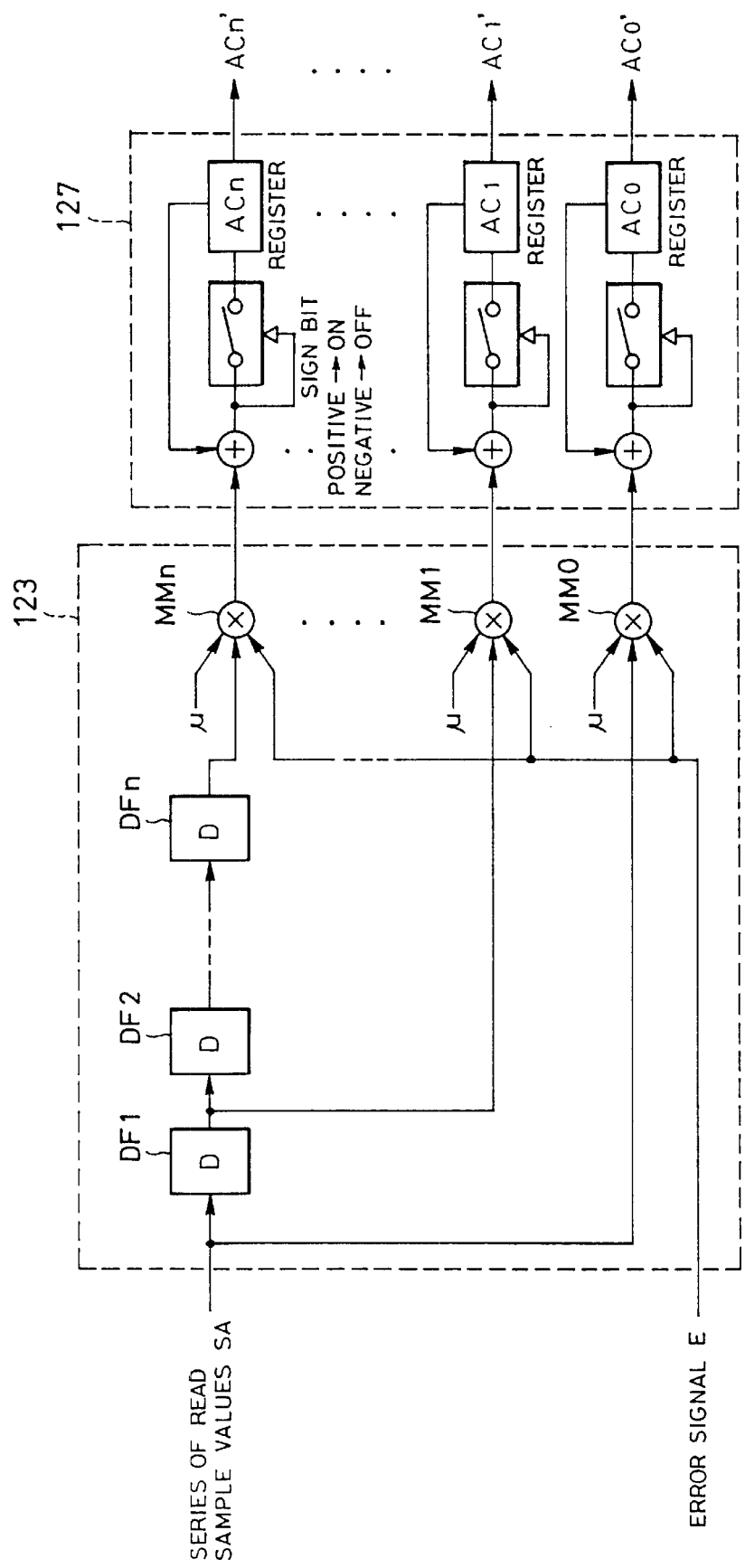
FIG. 4 is a diagram showing the internal structures of a filter coefficient calculator and a limiter circuit according to one embodiment of the present invention.

FIG. 4 is a diagram showing the internal structures of the filter coefficient calculator 123 and the limiter circuit 127 according to one embodiment of the present invention.

For example, the filter coefficient calculator 123 comprises N stages of series D flip-flops, DF1 to DFn, which latch a series of input sample values while shifting them, and multipliers MM0 to MMn. The multiplier MM0 sends correction values (the differences from the previous sample values), obtained by multiplying the series of input sample values SA by the error signal E and a correction coefficient $\mu$, to the limiter circuit 127. Likewise, each of the coefficient multipliers MM1–MMn sends correction values (the differences from the previous sample values), obtained by multiplying the output of the associated one of the D flip-flops DF1–DFn by the error signal E and the correction coefficient $\mu$, to the limiter circuit 127. The limiter circuit 127 adds the currently obtained correction value to a previous coefficient value ACn stored in a register, and outputs the previous coefficient value ACn directly as filter coefficients $AC_1'$ to $AC_n'$ when the added value (sign bit) is negative. When the added value is not negative, the added value is output as the filter coefficients $AC_1'$ to $AC_n'$.

The correction coefficient $\mu$ is employed for adjusting the convergence characteristic of the LMS adaptive algorithm. Increasing the correction coefficient $\mu$ increases a speed for the error signal E to be converged to zero at a price of possible divergence. Reducing the correction coefficient $\mu$, on the other hand, results in slower convergence while convergence is guaranteed.

The filter coefficient calculator 124 and the limiter circuit 128, which are associated with the series of crosstalk sample values CR2 from the other adjacent track (the track T−1 in FIG. 2) have the same structures as have been described above.

As explained above, designed to control the filter coefficients not to be negative, the crosstalk canceler can ensure fast convergence of the filter coefficient values and can operate in a stable manner.

Figure 5:
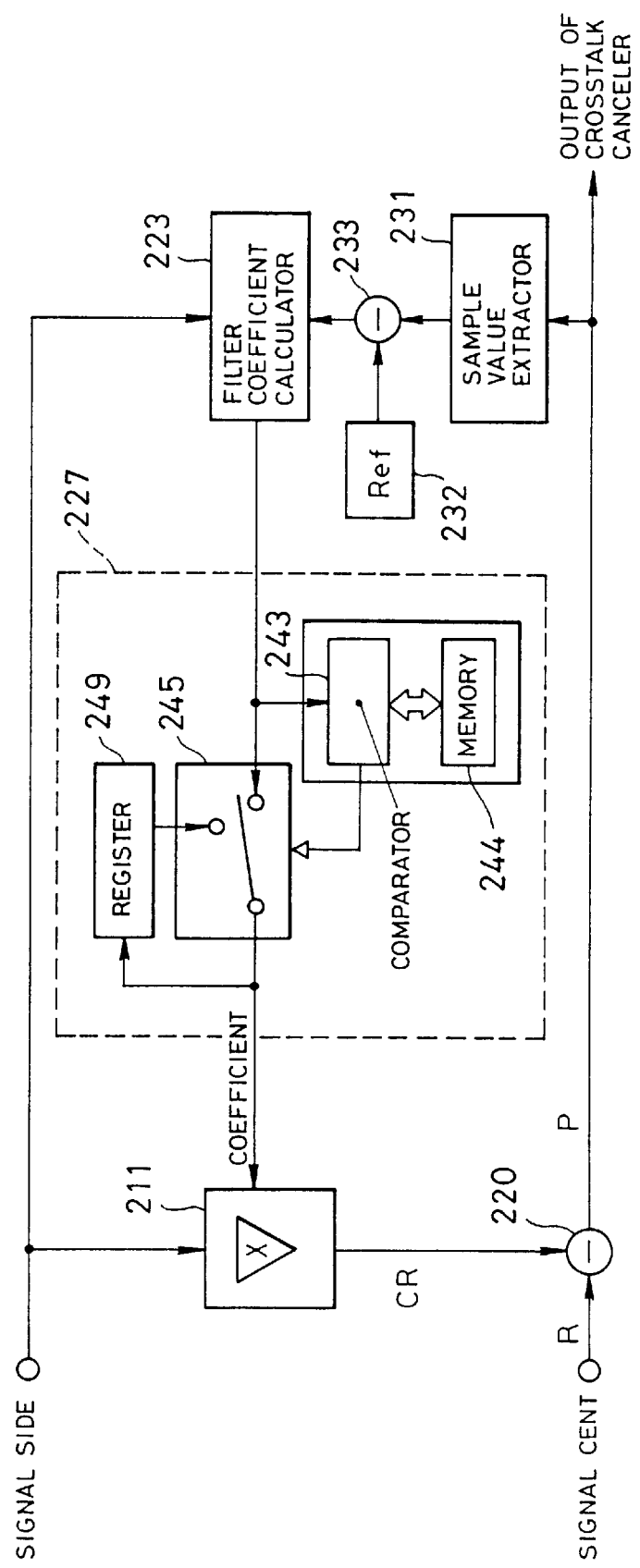
FIG. 5 is a block diagram illustrating the configuration of a crosstalk canceler according to another embodiment of the present invention.

FIG. 5 is a block diagram illustrating the configuration of a crosstalk canceler 10 according to another embodiment of the present invention.

The crosstalk canceler 10 comprises a variable coefficient filter 211, a subtracter 220, a filter coefficient calculator 223, a zero-cross sample value extractor 231, a reference value storage register 232, a reference value subtracter 233, and a limiter circuit 227. The limiter circuit 227 comprises a comparator 243, a memory 244 for storing a set value for restricting a filter coefficient, a switch 245 and a register 249 for storing the result of previous computation of the filter coefficient calculator 223.

The operation of the crosstalk canceler 10 according to the embodiment will be discussed below.

The subtracter 220 subtracts a series of crosstalk sample values CR from a series of read sample values R of a main signal (signal CENT) that is currently tracked, and sends the resultant signal as a series of read sample values P to the decision unit (not shown).

The reference value subtracter 233 subtracts a set reference value (Ref) of a predetermined level from values sampled by the zero-cross sample value extractor 231, and sends the resultant value to the filter coefficient calculator 223. The filter coefficient calculator 223 acquires filter coefficients from a series of read sample values of a sub signal (signal SIDE) and the error signal E, and sends the filter coefficients to the limiter circuit 227. The comparator 243 of the limiter circuit 227 compares the filter coefficients with a predetermined minimum value or a predetermined maximum value stored in advance in the memory 244. When the values of the filter coefficients are equal to or greater than the predetermined minimum value, or are equal to or smaller than the predetermined maximum value, or lie within the values, the comparator 243 causes the switch 245 to operate to supply the currently acquired filter coefficients as the filter coefficients $C_0$–$C_n$ to the variable coefficient filter 211. When the currently acquired values of the filter coefficients are not equal to or greater than the predetermined minimum value, or are not equal to or smaller than the predetermined maximum value, or do not lie within the values, the switch 245 is operated to supply the previously acquired filter coefficients, stored in the register 249, as the filter coefficients $C_0$–$C_n$ to the variable coefficient filter 211. The above-described operation can restrict the filter coefficients $C_0$–$C_n$ to be supplied to the variable coefficient filter 211 within a range of predetermined set values.

In this case, a value that can be regarded substantially to be zero relative to the other filter coefficients may be used as the predetermined minimum value. The maximum crosstalk value that has been measured in advance may be set as the predetermined maximum value. Alternatively, any empirical value which ensures good convergence may be used as the minimum value or the maximum value.

As apparent from the above, the present invention can realize a crosstalk canceler which can ensure fast convergence of the values of filter coefficients and can achieve stable operation by controlling the filter coefficients within a predetermined value range.

Although the limiter circuit has been described as having a hardware configuration in the foregoing description of the embodiments, it can easily be accomplished by software in a microcomputer.

Although the foregoing description of the embodiments has been given with reference to a crosstalk canceler that uses three beams, the present invention is not limited to the particular case but a single beam which covers adjacent tracks may be used. In this case, a single beam may be split into a main signal (signal CENT) and a sub signal (signal SIDE) by means of a photosensor which is divided into three parts.

While the foregoing description of the embodiments has been given with reference to a case where extraction of a residual crosstalk is implemented by using zero-cross sample values, the present invention is not limited to the particular case. The structure may be modified to acquire the amount of the residual crosstalk.

As described in detail above, as the values of filter coefficients are properly controlled, the present invention can provide a recorded information reproducing apparatus having a crosstalk canceler which can ensure fast convergence of the values of filter coefficients of an adaptive digital filter and thereby achieving stable operation.

What is claimed is:

1. A recorded information reproducing apparatus comprising:

reading means for reading recorded information from one track on a recording medium to acquire a first read signal, and for reading recorded information from at least one track adjacent to said one track to acquire a second read signal;

operating means for operating at least one coefficient on said second read signal;

subtracting means for subtracting an output of said operating means from said first read signal; and coefficient setting means for setting said at least one coefficient and for restricting said at least one coefficient in such a way that said at least one coefficient becomes greater than a first predetermined value or smaller than a second predetermined value, the first predetermined value being different from the second predetermined value.

2. The recorded information reproducing apparatus according to claim 1, wherein said coefficient setting means restricts said at least one coefficient in such a manner that said at least one coefficient does not become negative.

3. The recorded information reproducing apparatus according to claim 1, wherein said coefficient setting means restricts said at least one coefficient in such a manner that said at least one coefficient does not exceed the second predetermined value.

4. The recorded information reproducing apparatus according to claim 1, wherein said coefficient setting means sets a plurality of coefficients, and restricts said plurality of coefficients in such a manner that with respect to one of said plurality of coefficients, the other coefficients do not become substantially zero; and said operating means operating said plurality of coefficients on said second read signal.

5. The recorded information reproducing apparatus according to claim 1, wherein said reading means sets read signals read from two adjoining tracks on both sides of said one track as said second read signal.

6. The recorded information reproducing apparatus according to claim 1, wherein said operating means comprises at least one transversal filter.

7. The recorded information reproducing apparatus according to claim 1, wherein said coefficient setting means sets said at least one coefficient using an output of said operating means, obtained through adaptive signal processing based on an LMS (Least Mean Square) adaptive algorithm, as a crosstalk signal.

8. A recorded information reproducing apparatus comprising:

a reading unit which reads recorded information from one track on a recording medium to acquire a first read signal, and reads recorded information from at least one track adjacent to said one track to acquire a second read signal;

an operating unit which operates at least one coefficient on said second read signal;

a subtracter which subtracts an output of said operating unit from said first read signal; and a coefficient setting unit which sets said at least one coefficient and restricts said at least one coefficient in such a way that said at least one coefficient becomes greater than a first predetermined value or smaller than a second predetermined value, the first predetermined value being different from the second predetermined value.

9. The recorded information reproducing apparatus according to claim 8, wherein said coefficient setting unit restricts said at least one coefficient in such a manner that said at least one coefficient does not become negative.

10. The recorded information reproducing apparatus according to claim 8, wherein said coefficient setting unit restricts said at least one coefficient in such a manner that said at least one coefficient does not exceed the second predetermined value.

11. The recorded information reproducing apparatus according to claim 8, wherein said coefficient setting unit sets a plurality of coefficients, and restricts said plurality of coefficients in such a manner that with respect to one of said plurality of coefficients, the other coefficients do not become substantially zero; and said operating unit operates said plurality of coefficients on said second read signal.

12. The recorded information reproducing apparatus according to claim 8, wherein said reading unit sets read signals read from two adjoining tracks on both sides of said one track as said second read signal.

13. The recorded information reproducing apparatus according to claim 8, wherein said operating unit comprises at least one transversal filter.

14. The recorded information reproducing apparatus according to claim 8, wherein said coefficient setting unit sets said at least one coefficient using an output of said operating unit, obtained through adaptive signal processing based on an LMS (Least Mean Square) adaptive algorithm, as a crosstalk signal.

* * * * *